US006236930B1

(12) United States Patent
Teague et al.

(10) Patent No.: US 6,236,930 B1
(45) Date of Patent: May 22, 2001

(54) SENSOR OUTPUT PRECISION ENHANCEMENT IN AN AUTOMOTIVE CONTROL SYSTEM

(75) Inventors: Bruce H. Teague, Grosse Pointe Park; Kenneth P. DeGroot, Macomb Township; Thomas A. Larson, Bloomfield Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/406,591

(22) Filed: Sep. 27, 1999

(51) Int. Cl.[7] .......................... F02D 41/14; G05B 15/02

(52) U.S. Cl. .......................... 701/103; 701/109; 73/23.32

(58) Field of Search .................................... 701/101, 102, 701/103, 104, 105, 108, 109; 73/23.32; 123/672, 693, 694, 695, 696

(56) References Cited

U.S. PATENT DOCUMENTS

| | | | | |
|---|---|---|---|---|
| 3,910,243 | | 10/1975 | Gau et al. | 123/406.53 |
| 4,266,274 | * | 5/1981 | Barman | 701/108 |
| 4,556,955 | * | 12/1985 | Wright et al. | 701/108 |
| 5,003,952 | | 4/1991 | Weglarz et al. | 123/478 |
| 5,003,953 | | 4/1991 | Weglarz et al. | 123/478 |
| 5,119,671 | | 6/1992 | Kopera | 73/116 |
| 5,161,497 | | 11/1992 | Simko et al. | 123/90.15 |
| 5,272,871 | | 12/1993 | Oshima et al. | 60/274 |
| 5,371,577 | | 12/1994 | Fujimura et al. | 355/215 |
| 5,404,719 | | 4/1995 | Araki et al. | 60/276 |
| 5,542,403 | | 8/1996 | Borland et al. | 123/686 |
| 5,596,975 | | 1/1997 | Thomas et al. | 123/686 |
| 5,675,069 | * | 10/1997 | Schleupen et al. | 73/23.32 |
| 5,727,385 | | 3/1998 | Hepburn | 60/297 |
| 5,753,192 | | 5/1998 | Dobson et al. | 422/177 |
| 5,758,489 | | 6/1998 | Hepburn et al. | 60/274 |
| 5,766,562 | | 6/1998 | Chattha et al. | 423/213.5 |
| 5,771,868 | | 6/1998 | Khair | 60/605.2 |
| 5,819,195 | * | 10/1998 | Iwata | 701/103 |

OTHER PUBLICATIONS

Jacquot, Raymond G.; “Modern Digital Control Systems”; (1981).

Kishi, et al; “Development of the High Performance L4 Engine ULEV System”; (1998); pp 27–36.

Hasegawa et al; Individual Cylinder Air–Fuel Ration Feedback Control Using an Observer; pp 137–144.

Carnevale, et al; Cylinder to Cylinder AFR Control with an Asymmetrical Exhaust Manifold in a GDI System; SAE Technical Paper Series No. 981064; (1998).

* cited by examiner

*Primary Examiner*—Willis R. Wolfe
(74) *Attorney, Agent, or Firm*—Donna L. Berry

(57) ABSTRACT

The analog input of a sensor is connected to a 10-bit analog-to-digital converter. The converted is powered using a 5V supply. The A/D is interfaced with a microprocessor; however, only the least significant eight bits of the A/D output are connected to the microprocessor input. The microprocessor is used to adjust the fuel-air mixture used in engine combustion based on the output of the sensor. The use of the 10-bit A/D interfaced with only eight bits allows increased precision and increased computational speed. The increased precision allows more accurate adjustment of the fuel-air mixture to enable the engine to run closer to its stoichiometric point.

10 Claims, 3 Drawing Sheets

SENSOR OUTPUT PRECISION ENHANCEMENT IN AN AUTOMOTIVE CONTROL SYSTEM

BACKGROUND OF THE INVENTION

1. Field of the Invention

The present invention relates generally to sensor measurements in automobile control systems and, more particularly, to a system for enhancing the precision of an analog sensor reading in an automobile control system.

2. Discussion of Related Art

Current automobile engines are internal combustion engines that use a mixture of fuel and air to generate their driving power. Complete fuel combustion produces only carbon dioxide and water as its products; however, the conditions within an engine do not correspond to the idealized requirements necessary to produce complete combustion. Incomplete combustion produces other products that may include: carbon monoxide, hydrogen gas, hydrocarbons, nitrogen gas, oxygen gas and various nitrous oxides. Some of these gases are commonly found in the atmosphere and pose few or no health risks. Others can be highly toxic, and their emissions must be reduced.

The United States and many other countries have strict standards regulating the emissions from automobiles. Catalytic converters transform toxic chemicals into safer compounds. They convert CO; $H_2$ and HC into $CO_2$ and $H_2O$ and also convert nitrous oxides into nitrogen gas and oxygen gas before these gases are emitted from the automobile; however, catalytic converters are not completely efficient, and some of the toxic byproducts of incomplete combustion are not converted into less harmful substances before their emission into the atmosphere. The higher the efficiency of the catalytic converter, the more toxic gases are converted into safer forms before they are emitted into the atmosphere. The efficiency of a catalytic converter is directly related to the composition of its intake gases, and the composition of the intake gases is determined by the combustion conditions, including the fuel-air mixture ratio used in the engine.

The mixture of fuel and air used in the combustion chamber of an engine is regulated through a feedback mechanism. A sensor is placed in the exhaust manifold, and it measures the oxygen content in the expunged gases. The oxygen content of the combusted mixture can be used to determine where in relation to the stoichiometric operating point the engine is currently operating. Typically, the operating point of the engine is called the stoichiometric fuel-air ratio, and this corresponds to the point where the exact quantity of fuel needed for completed combustion is added to the air flow. The stoichiometric point has the most efficient catalyst operation and produces the least amount of toxic byproducts. The varying operating characteristics of the vehicle will change the efficiency of the combustion process and will require altering the current fuel flow to keep the engine operating at or near the stoichiometric point. The oxygen sensor output is used to optimize the fuel-air ratio fed into the engine. Optimizing the fuel-air mixture entering into the engine changes the combustion conditions and achieves more complete combustion, thereby operating the engine closer to the stoichiometric point.

The oxygen sensors used in most vehicles provide a voltage output based on the amount of oxygen in the combustion product. This information is input into an analog-to-digital converter (A/D) and the output of the A/D is fed into a digital microprocessor. The microprocessor controls the fuel-air ratio and constantly adjusts the mixture entering the combustion chamber in order to keep the engine operating near the stoichiometric point. Constant adjustment is required, because changing engine and environmental conditions alter the efficiency of the combustion process, even for a constant fuel-air mixture ratio. The voltage output of the oxygen sensor varies with the amount of oxygen found in the combustion products. The variation in voltage directly around the stoichiometric operating point is large and away from the stoichiometric point the variation is small, even for a large oxygen content change, as shown in FIG. 2. The non-linear voltage dependence makes measuring the prevailing operating point difficult since the variation around the stoichiometric point during the engine's normal operation is generally large. The normal functioning of the engine will include operation in regions away from the stoichiometric point, where when the variation in exhaust oxygen content is large only a small voltage change in the sensor occurs. This small voltage change requires a precise system to detect the changes and to determine the exact operating point of the engine. The precision of present measurement systems is only accurate enough to allow a precise determination of the operating point directly around the stoichiometric value. When non-trivial variations from the stoichiometric point occur, the difficulty in obtaining an exact measurement due to the lack of precision in reading the analog voltage change essentially transforms the oxygen sensor into a switch sensor; the engine is operating above or below the stoichiometric point but no data is provided as to the exact oxygen content. This large variation and resulting imprecise measurement does not allow an adequate fuel-air ratio adjustment to efficiently drive the engine back to the stoichiometric operating point.

A more precise method of measuring the voltage output from an analog sensor in an automobile control system is needed. The method must increase the precision of the analog readings and must allow an accurate determination of the operating point of the engine over the sensor's entire range of output values.

SUMMARY OF THE INVENTION

In accordance with the teachings of the present invention, a system for enhancing the precision of an analog sensor reading in an automobile control system is disclosed.

The analog input of a sensor is connected to a 10-bit analog-to-digital (A/D) converter. The converter is referenced to a 5V supply. The 10-bit A/D is interfaced with a microprocessor; however, only the least significant eight bits of the A/D output are used in the software control program. The microprocessor adjusts the fuel-air mixture used in combustion based on the output of the sensor.

In this instance, use of the lower eight bits of the A/D allows increased precision and increased speed. The analog sensor produces a maximum output of approximately 1.25V. Therefore, the two most significant bits of the A/D are not used in measuring the sensor's input, but all of the lower eight bits are used. This provides increased resolution in the conversion. Eight bit segments are the fundamental computation unit of microprocessors, and interfacing only the eight bits, instead of all ten, significantly increases the speed of the control system. A larger operand, such as 10-bits, would require software adjustment to perform computations, and this would slow the speed of the control system. The increased precision allows a more accurate adjustment of the fuel-air mixture, and enables the engine to run closer to its stoichiometric point. The connection of the A/D to the microprocessor exploits the full speed capability of the processor.

Additional objects, advantages and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to the precision enhancement of reading an analog sensor in an automobile control system is merely exemplary in nature and is in no way intended to limit the invention or its applications or uses.

Figure 1:
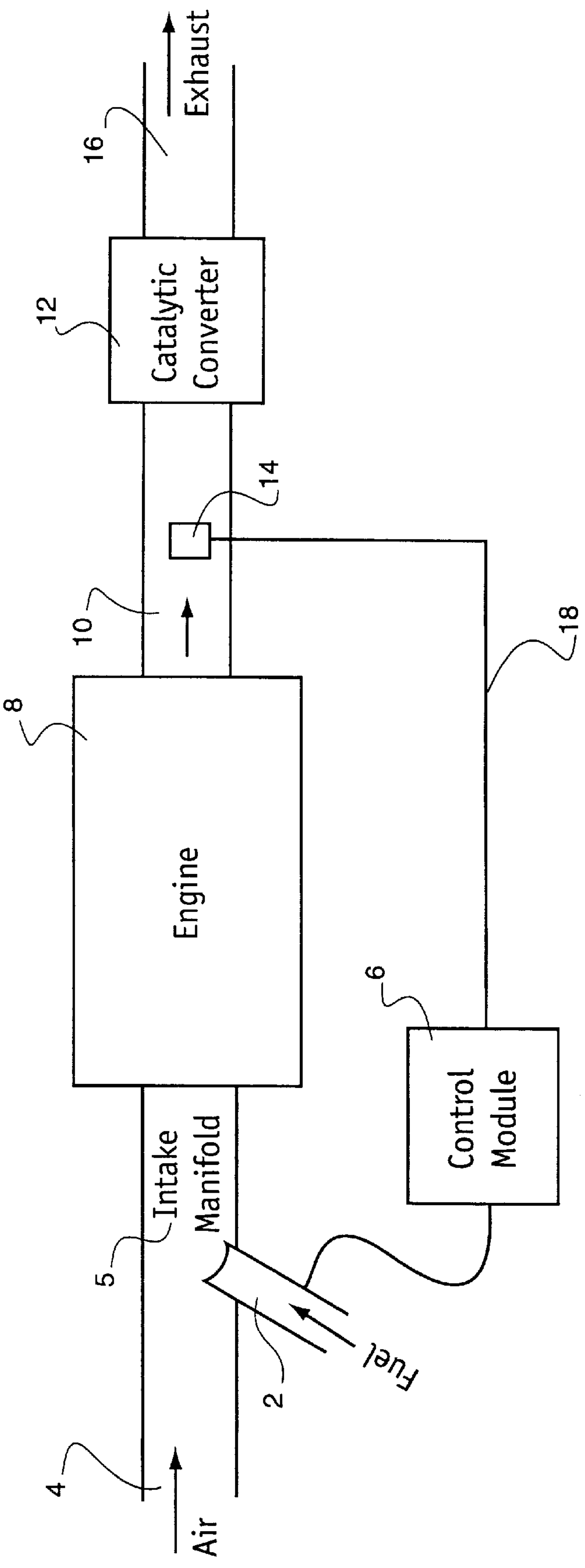
FIG. 1 is a flow diagram of the exhaust and fuel-air control system in an automobile.

FIG. 1 is a flow diagram of the exhaust and fuel control system in a vehicle. Fuel 2 and air 4 are fed separately into the intake manifold 5 where they are mixed together. The fuel-air mixture is fed into the engine 8 where it is combusted to produce drive power for the vehicle. The combustion of the fuel 2 and air 4 produces various byproducts that are expelled from the engine 8 after combustion. The combustion byproducts are generically termed the combustion exhaust 10. The combustion exhaust 10 is fed into a catalytic converter 12. The catalytic converter 12 reacts the various toxic byproducts from the exhaust gases into safer compounds before they are emitted as vehicle exhaust 16. The efficiency of the catalytic converter 12 varies with the composition of the combustion exhaust 10. The composition of the combustion exhaust 10 varies with the fuel-air mixture and the engine's operating conditions.

A sensor 14 monitors the combustion exhaust 10 emitted from the engine 8. The sensor 14 examines the byproducts produced by the combustion process and feeds this information back to the fuel/air mixture control module 6. The fuel/air mixture control module 6 adjusts the ratio of the fuel 2 and air 4 in the mixture sent to the engine 8 and thereby alters the composition of the combustion exhaust 10. The adjustment of the fuel-air mixture allows the engine 8 to operate closer to the stoichiometric point. At this point, the efficiency of the catalytic converter 12 is the greatest and the least amount of toxic byproducts are emitted in the vehicle exhaust 16.

The sensor 14 used in the present design is an oxygen sensor. It measures the amount of oxygen present in the gas emitted from the engine 8 after combustion. The sensor 14 operates as a voltage source. It produces an output between zero and approximately 1 volt based on the amount of oxygen present in the combustion exhaust 10. The less the amount of oxygen present (higher equivalence ratio) in the combustion exhaust 10, the greater the voltage outputted by the sensor 14. The amount of oxygen present in the combustion exhaust 10 can be used to determine where in relation to the stoichiometric point the engine 8 is operating and how the fuel-air mixture should be adjusted to move the engine 8 closer to the stoichiometric operating point.

Figure 2:
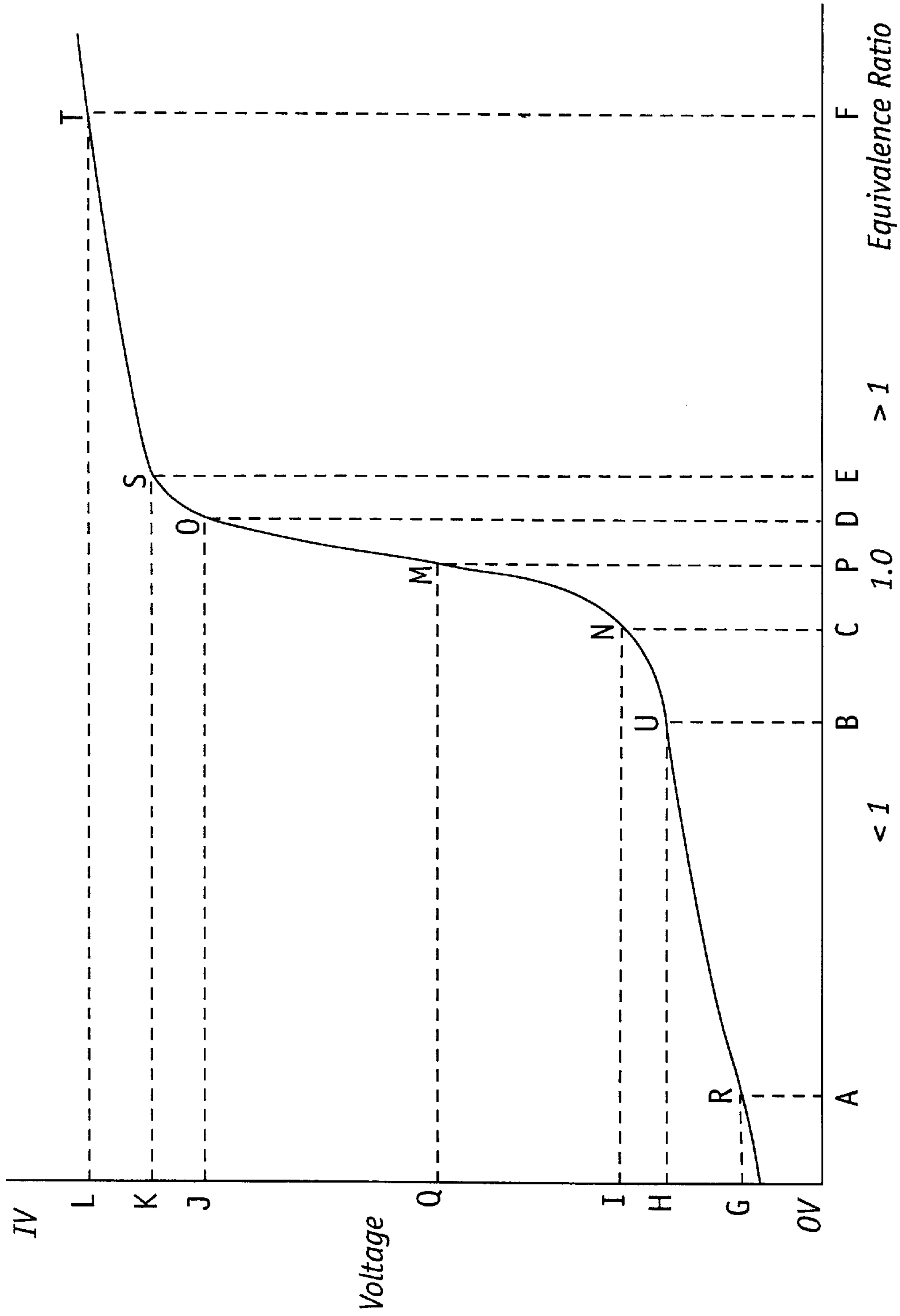
FIG. 2 is a graph of the relative fuel-air ratio (equivalence ratio) in the combustion exhaust versus voltage output by the oxygen sensor.

FIG. 2 shows the operating curve of the oxygen sensor 14. The equivalence ratio in the combustion exhaust 10 is graphed on the x-axis and the output voltage of the oxygen sensor 14 is placed on the y-axis. The stoichiometric operating point (M) represents the point at which the combustion in the engine 8 is closest to complete. At this point the catalytic converter 12 operates most efficiently. The range (P) to (F) represents a rich mixture of fuel to oxygen. In this range, relatively little oxygen is present after the combustion process. The range (P) to (A) represents a lean mixture used in combustion. In this range, the amount of oxygen emitted after the combustion process is relatively great. In both of these ranges the combustion of the engine 8 becomes less complete, and while this does not greatly affect the performance of the engine 8, the efficiency of the catalytic converter 12 drops and more toxic compounds are emitted in the vehicle exhaust 16.

The stoichiometric operating point (M) corresponds to a set voltage output (Q) from the oxygen sensor 14. It should be noted that this point does not necessarily correspond to exactly half the value of the maximum output of the sensor 14 and this point may vary along the curve, between (N) and (O), during the vehicle's normal operation. In can be seen that the range of the curve from (N) to (O) around the stoichiometric point (M) is very steep. Moving from point (N) to (O) on the curve represents a small change in the equivalence ratio in the combustion exhaust 10. This change is from (C) to (D) on the x-axis. This small change along the operating curve represents a large voltage change, from points (I) to (J) on the y-axis. Since the small equivalence ratio change, from (C) to (D) corresponds to a large voltage change, from (I) to (J), it is easy to determine where along the operating curve from (N) to (O) the current equivalence ratio lies and to adjust the fuel-air mixture accordingly to move the air/fuel mixture of the engine 8 closer to the stoichiometric point. Outside this area, however, making the determination of the operating point on the curve is difficult, because a large equivalence ratio change corresponds to a small voltage change. This difficulty comes from measuring small changes in the sensor's analog output voltage.

Figure 3:
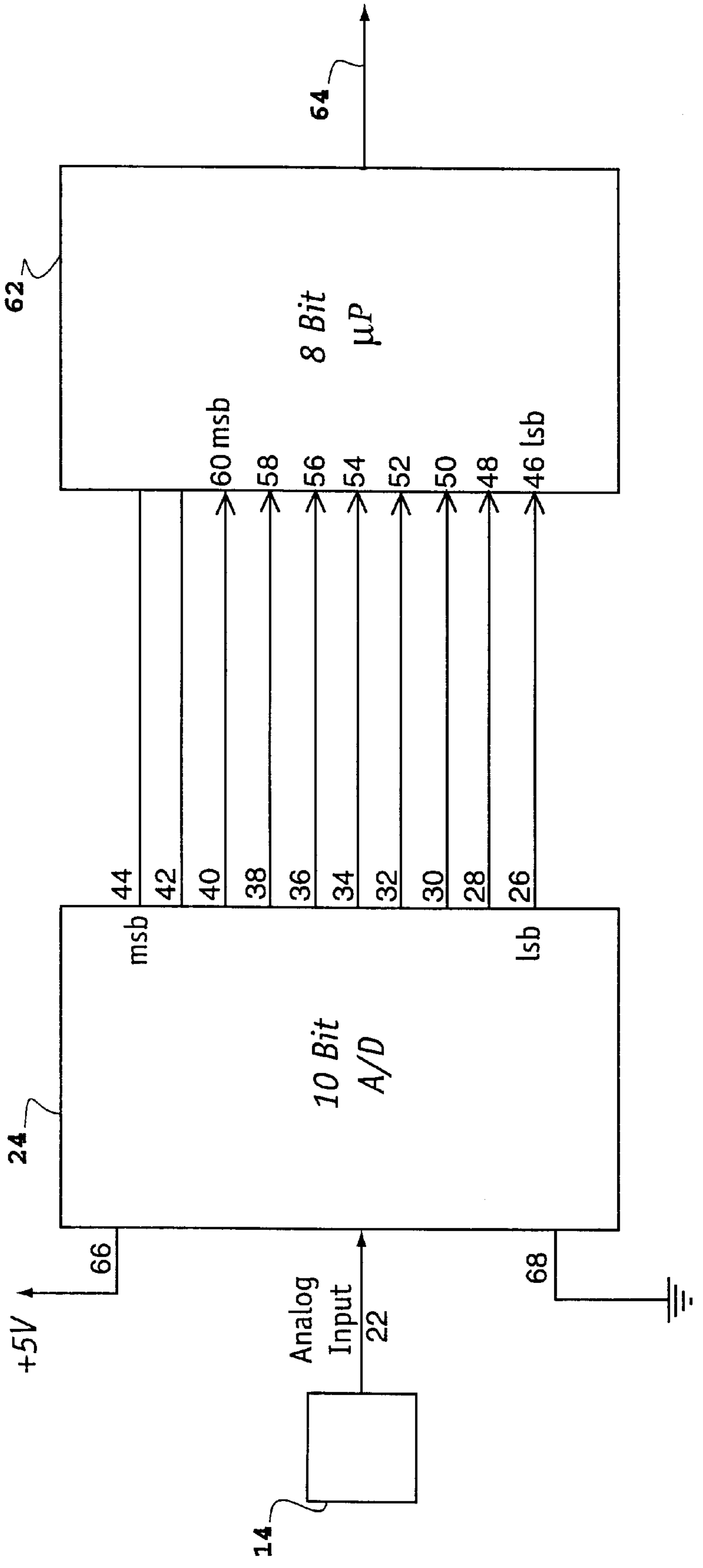
FIG. 3 is a block diagram of the analog-to-digital converter interfaced to a microprocessor.

FIG. 3 shows the control circuitry used to analyze the oxygen sensor's output and to adjust the fuel-air mixture that is provided into the engine 8. The analog output of the sensor 14 is fed into the analog input 22 of the analog-to-digital converter (A/D) 24. The analog-to-digital converter 24 takes the analog signal 22 and converts it into a digitally encoded 10 bit output 26, 28, 30, 32, 34, 36, 38, 40, 42 and 44.

The A/D 24 operates using a supply voltage 66 and a ground 68. The input 22 is analog, but the outputs 26–44 are digital. The digital outputs 26–44 occupy one of two states: one, represented by 5 volts (which is the supply voltage 66), or zero, represented by 0 volts (which is the ground terminal 68). The A/D 24 is a ten bit device, which means that it has ten outputs pins 26–44. The outputs 26–44 are combined to represent a binary number. One output pin 44 is assigned as the most significant bit of the number, and the opposite output pin 26 is assigned as the least significant bit. The intermediate bits 28–42 are read in their respective orders to form a 10-bit number.

The A/D 24 converts the analog input voltage 22 to a digital value within the range $3FF (all ones on the output bits 26–44) and $000 (all zeros on the output bits 26–44). The analog input 22 voltage ranges from ground 68 to the supply voltage 66. A signal of the magnitude of the supply voltage 66 is converted to an output of all ones. This corresponds to the digital value of $3FF in a ten bit A/D. An input of zero volts is converted to an output of all zeros; this corresponds to a digital output value of $000.

Voltage signals between ground 68 and the supply voltage 66 are converted to binary outputs between all zeros and all ones based on a linear relationship. Therefore, the outputs 26–44 are divided into equal graduations based on the input voltage change. A ten bit binary number can take one of 1024 possible values. By dividing the range of possible input voltages by the number of possible output values, the sensitivity of the A/D can be determined. Using a supply voltage of 5 volts and ten output bits, the sensitivity of the A/D is approximately 5 mV per A/D bit (5V divided by 1024 graduations). This means that a 5 mV change in the input voltage is required to move the output bits 26–44 from one binary value to an adjacent binary value.

The present invention uses a 10-bit A/D 24, and this has several advantages over traditional designs. First, it is known to use an eight-bit A/D that allows its binary output to be one of 256 possible values. Using a supply voltage of 5V with an eight bit A/D gives a resolution of approximately 20 mV. The output of an eight-bit A/D has 256 values ranging across five volts; the sensor input is restricted to a maximum of 1V, so the sensor uses approximately only 51, of the possible 256, distinct outputs values. This severely restricts the precision that can be gleaned from using an 8-bit A/D for analog measurements. The Applicant's use of the 10-bit A/D 24 increases the precision to 5 mV. For a 1.25V maximum signal, approximately 256 different levels, out of a possible 1024, are used in the output 26–44. This significantly increases the precision over previous designs—by a factor of four.

Second, the present invention only interfaces eight of the ten output lines from the A/D 24 into the microprocessor 62. Previously, it has been known to interface all the bits. Microprocessors are built based on 8-bit computational blocks. Thus, a microprocessor can be an 8-bit, 16-bit, 32-bit, 64-bit or 128-bit device. This means that when the microprocessor 62 performs operations such as additions and multiplications its internal hardware manipulates the operands in eight-bit segments. Other larger operands can be accommodated through software, but the actual hardware manipulation is still done in 8-bit blocks. The software accommodation of larger operands is a time intensive process, and it significantly slows the overall speed of the control system. The input signal 22, having a maximum value of approximately 1V, inputted into a 10-bit A/D 24 driven at 5V will only use the least significant eight bits 26–40 of the output. Connecting only the 8 lines eliminates the need for the added software overhead of manipulating 10-bit operands. The connection of only the least significant eight bits is feasible because the upper two bits are not used in the computations for control of the fuel system of the present invention wherein the sensor has a maximum value of approximately 1V. This saves considerable computational time and significantly improves the overall performance of the system.

The 10-bit A/D 24 and microprocessor 62 are shown to be separate components in the hardware design. In an alternative embodiment, the analog-to-digital converter 24 and microprocessor 62 are integrated into a single hardware component. Many microprocessors also include a built-in analog-to-digital converter. Using the existing integrated hardware saves the additional expense of buying separate components. It also reduces added difficulties encountered by adding external hardware to a system.

FIG. 1 shows the A/D 24 and microprocessor 62 integrated into the fuel/air control module 6. In an alternative embodiment, the A/D 24 and microprocessor 62 can be separated from the fuel/air control module 6. The A/D 24 and microprocessor 62 perform the adjustment computations separately and send control signals to the mixture control module 6. The mixture control module 6 alters the fuel-air mixture based on the signals received from the microprocessor 62.

With continued reference to FIGS. 2 and 3, a change in operating points from (M) to (N), as has been previously discussed, corresponds to a large voltage change, from (Q) to (I). This type of a change is easily detected by the microprocessor 62, because the wide voltage swing of the sensor 14, generally in the tenth of volts range, is easily detected with any A/D having a resolution in the tens of millivolts range. A change in operating points from (U) to (R) represents a large swing in the equivalence ratio in the combustion exhaust 10, from (B) to (A); however, the change from (B) to (A) in equivalence only corresponds to a small voltage change, from (H) to (G). If the voltage change from (H) to (G) is approximately 20 mV or less, then the change cannot be detected by an 8-bit A/D system, although a large change in the oxygen content has occurred. If the range is approximately 20–40 mV, this corresponds to only one to two bits of precision in the previously available 20 mV step size. This is not enough to determine, with any precision, the operating point. This small change in voltage can be interpreted (or mis-interpreted) as noise.

In the Applicant's invention a new step size of 5 mV is produced. Now, a change in voltage of 20 mV, which was previous undetectable and corresponded to a large change in oxygen content, can be detected and measured with several bits of precision. This significantly improves the accuracy of the measurement and the determination of the operating point on the curve.

The same analysis occurs on the other side of the curve. A change in operating points from (S) to (T) corresponds to a large change in equivalence ratio, from (E) to (F); however, this corresponds to a small change in voltage, from (K) to (L). In previous schemes using approximately a 20 mV step size, this change is not detectable with any precision. In the current invention, using 5 mV step sizes, the change is detectable and the new operating point can be accurately determined.

It is desirable to detect with precision the changes within the ranges (O) to (T) and (N) to (R) because the adjustment of the fuel-air mixture to bring the engine near stoichiometric varies within this range. The adjustment at point (U) required to achieve the stoichiometric operating point will not achieve stoichiometric operation if it is also used at point (R). Therefore, to achieve efficient control of the system, the microprocessor 62 must be able to precisely determine the operating point over the entire sensor range.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

We claim:

1. A control system for regulating the fuel and air mixture used in an engine, the system comprising:

an engine capable of producing drive power through combustion of fuel and air;

an analog sensor operably connected to the engine and capable of monitoring gases produced through the combustion of fuel and air in the engine;

an analog-to-digital converter capable of receiving input from the analog sensor, the analog-to-digital converter having a plurality of output bits, the input from the analog sensor being less than a maximum input signal to the analog-to-digital converter, and wherein less than the plurality of bits are required to specify a range between a minimum and the maximum input signal;

a microprocessor receiving input from less than the plurality of output bits of the analog-to-digital converter; and a mixture control module, capable of producing a mixture of fuel and air and capable of supplying the mixture to the engine, where the mixture control module is capable of adjusting the mixture based on the output of the microprocessor based on the input from the analog sensor.

2. The system of claim 1 where the analog-to-digital converter has ten output bits.

3. The system of claim 2 where the least significant eight output bits of the analog-to-digital converter are connected to the microprocessor.

4. The system of claim 1 where the analog sensor is an oxygen sensor, capable of measuring the oxygen content in the combustion exhaust and produces an output voltage based on the content of oxygen in the combustion exhaust.

5. The system of claim 4 where the output voltage is less than 1.25 volts.

6. A control system for regulating the fuel and air mixture used in an engine, the system comprising:

an engine capable of producing drive power through combustion of fuel and air;

an analog sensor operably connected to the engine and capable of monitoring an amount of oxygen in the combustion exhaust; and a mixture control module further comprising an analog-to-digital converter, having a plurality of output bits, and a microprocessor, where an output of the analog sensor is operably connected to the mixture control module and read into the analog-to-digital converter based on the input from the analog sensor;

wherein the input from the analog sensor is less than a maximum input signal to the analog-to-digital converter and less than the plurality of bits are required to specify a range between a minimum and the maximum input signal;

wherein less than the plurality of the output bits of the analog-to-digital converter are inputted to the microprocessor; and wherein the output of the microprocessor alters the fuel-air mixture provided by the mixture control module to the engine.

7. The system according to claim 6 where the analog-to-digital converter has ten output bits.

8. The system according to claim 7 where the least significant eight output bits of the analog-to-digital converter are connected to the microprocessor.

9. The system according to claim 6 where a maximum output voltage of the sensor is 1.25 volts.

10. A method for controlling a fuel and air mixture in an engine comprising the step of:

monitoring an engine's exhaust using an analog sensor;

converting an analog sensor reading into a digital value using an analog-to-digital converter having a plurality of outputs;

reading less than the plurality of outputs of the analog-to-digital converter into a microprocessor;

receiving a feedback input from the analog sensor through the analog-to-digital converter and the microprocessor;

controlling a mixture of air and fuel into the engine based on an output of the microprocessor; and wherein the input from the analog sensor is less than a maximum input signal to the analog-to-digital converter and less than the plurality of bits are required to specify a range between a minimum and the maximum input signal.

* * * * *